United States Patent [19]

Lupinski et al.

[11] 4,257,861

[45] Mar. 24, 1981

[54] ELECTROCOATING COMPOSITIONS AND ELECTROCOATING METHOD

[75] Inventors: John H. Lupinski, Scotia; Wilson J. Barnes, Schenectady, both of N.Y.

[73] Assignee: General Electric Company, Schenectady, N.Y.

[21] Appl. No.: 99,620

[22] Filed: Dec. 3, 1979

Related U.S. Application Data

[60] Continuation of Ser. No. 908,543, May 22, 1978, abandoned, which is a division of Ser. No. 722,019, Sep. 10, 1926, abandoned.

[51] Int. Cl.$^3$ ............................................. C25D 13/06
[52] U.S. Cl. ............................. 204/181 R; 204/181 T
[58] Field of Search ............ 204/181 A, 181 T, 181 R

[56] References Cited

U.S. PATENT DOCUMENTS

| | | | |
|---|---|---|---|
| 3,493,540 | 2/1970 | Muller et al. | 260/47 |
| 3,702,813 | 11/1972 | Tanaka et al. | 204/181 R |

*Primary Examiner*—Howard S. Williams
*Attorney, Agent, or Firm*—William A. Teoli; James C. Davis, Jr.

[57] ABSTRACT

Electrocoating compositions are provided in the form of aqueous dispersions of particulated polyimide. In addition, a method is also described for electrocoating metallic conductors, such as copper wire or aluminum strip. The particulated polyimide aqueous dispersions can be electrodeposited at significantly lower voltages than the corresponding polyamide acid salts.

2 Claims, No Drawings

ELECTROCOATING COMPOSITIONS AND ELECTROCOATING METHOD

This application is a continuation of application Ser. No. 908,543, filed May 22, 1978 which is a division of Ser. No. 722,019, filed Sept. 10, 1976, both now abandoned.

The present invention relates to electrocoating compositions in the form of aqueous dispersions of particulated polyamideimide. More particularly, the present invention relates to a method of electrocoating metallic conductors and to the insulated conductors obtained therefrom.

Prior to the present invention, as shown by U.S. Pat. No. 3,850,773, Lupinski et al, assigned to the same assignee as the present invention, copper wire or aluminum strip was continuously electrocoated by passing such metallic conductor through a polyamide acid salt electrocoating bath in a continuous manner. Those skilled in the art know that electrocoating has many significant advantages over dip coating. One advantage is that several dips are often required to insulate a conductor, whereas electrocoating can readily be achieved in one pass. One of the disadvantages of electrocoating, however, is that the electrocoating bath composition changes during continuous operation and special efforts must be made to maintain the bath at its proper operating composition. For instance, the base content of a coating bath increases during continuous electrocoating and excess base has to be removed from the bath or has to be compensated for by replenishments with carefully controlled composition. A further disadvantage is that a high voltage is often required to electrodeposite the organic resin. It has been generally found that increasing polyamide acid salt sites enhances polymer backbone stability. However, an increase in the polyamide acid salt sites generally reduces the coulomb yield of the polymer because more charge per part of polymer by weight has to be discharged at the electrode. A further disadvantage is that significant amounts of organic solvent, such as dipolar aprotic solvents, are necessary to keep the polyamide acid salt in solution.

The present invention is based on the discovery that fully imidized polyimide in the form of a dispersion can be electrodeposited directly onto a copper or aluminum conductor to produce a polyimide coated conductor without a subsequent ring closing reaction required to convert electrodeposited polyamide acid to the polyimide state. In addition, the coulomb yield of the polyimide electrocoating bath is significantly higher than the corresponding polyamide acid salt bath since the aqueous dispersion of the polyimide is substantially free of polyamide acid salt radicals. The integrity of the electrodeposited polyimide film, made in accordance with the method of the present invention, is often superior to the polyimide film derived from electrodeposited polyamide acid which requires a ring closing reaction to convert the polyamide acid to the polyimide.

There is provided by the present invention, electrocoating compositions comprising an aqueous dispersion of polyimide, containing as essential ingredients by weight, (A) from 5% to 45% by weight of an organic solvent,
(B) from 40% to 94% of water and
(C) from 1% to 15% of polyimide, where the sum of (A) + (B) + (C) is equal to 100%.

Another aspect of the present invention is directed to an electrocoating method which comprises, (1) making a sprayable, substantially uniform mixture of a polyimide and an organic solvent,
(2) introducing the sprayable mixture of (1) into water under conditions of high agitation to produce a colloidal dispersion of the polyimide in an aqueous-organic solvent medium containing as essential ingredients by weight of
(D) 5% to 45% of organic solvent,
(E) 40% to 94% of water and
(F) from 1% to 15% of polyimide, and
(3) employing the colloidal dispersion of (2) as an electrocoating bath to effect the electrodeposition of the polyimide onto a metallic conductor which is passed into the electrocoating bath and serves as an electrode, and
(4) heating the resulting polyimide coated metallic conductor to effect the removal of volatiles therefrom.

As used hereinafter, the term polyimide signifies any polyimide which is at least partially soluble in an aprotic polar organic solvent, as defined hereinafter. The polyimides can have imide functionality in the polymer backbone, or in the pendant position and include poly(aspartimide), poly(amideimide)s, poly(amideacidimide)s, poly(esterimide)s, etc.; polyimides containing functional units, or polymeric blocks of organo siloxane, polycarbonate, polysulfone, polyurethane, etc., substituted with radicals such as organo silyl, alkoxy, etc. Other examples include polymers shown in Edward's U.S. Pat. Nos. 2,710,853, 2,867,609 and 3,179,634. Additional examples of the aforementioned polyimides are shown in U.S. Pat. Nos. 3,179,635, 3,264,250, 3,493,540 and 3,536,670, 3,562,223, etc.; polyamides shown in patents assigned to the same assignee as the present invention, such as Holub U.S. Pat. No. 3,325,450, Loncrini U.S. Pat. No. 3,360,502, etc. also can be employed.

Some of the preferred polyimides which can be used in the practice of the invention can have chemically combined units such as,

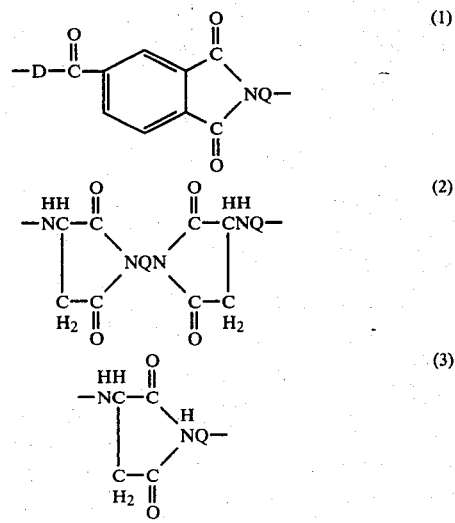

where Q is a divalent organo radical free of aliphatic unsaturation and D is a member selected from $$-O- \text{ and } -\overset{H}{\underset{}{N}}-.$$

Some of the imides having units of formula (1) are shown in copending application of Holub and Gaertner Ser. No. 40,802, filed May 27, 1970, now abandoned, and assigned to the same assignee as the present invention. As disclosed by Holub and Gaertner, polyimides can be made by heating the reaction products of organic diamines of the formula, $$NH_2QNH_2$$

and a benzene carboxylic acid reactant selected from a 4-haloformylphthalic anhydride, or a mixture of a 4-haloformylphthalic anhydride and a bis-phthalolylhalide.

Polyimides having units of formula 2, or a mixture of formula (2) and (3) units, can be made by effecting reaction between organic diamines as defined above and maleic anhydride, as taught in Ger Offen U.S. Pat. No. 1,962,845, June 18, 1970. In addition, polyimides having units of formula (1) can be made by the method of S. Terney, J. Keating and J. Zielinski, Journal of Polymer Science, p. 686, vol. 8 (1970), by effecting reaction between diphenylmethane diisocyanate and trimelitic anhydride in N-methyl pyrrolidone.

In formulas (1)-(3) above, Q is selected from divalent hydrocarbon, such as arylene, alkylene and radicals such as, $$-ROR-, -R\overset{O}{\underset{}{C}}R-, -R\overset{O}{\underset{O}{S}}R-,$$

etc., where R is divalent hydrocarbon.

In addition to the above described polyimides, there also can be employed in the practice of the invention, polyimides which are made by the method shown by Klebe and Windish, copending application Ser. No. 838,322, filed July 1, 1969, now abandoned, and assigned to the same assignee as the present invention. As described by Klebe et al., various aromatic carbocyclic organic polymers, such as polystyrene, polyaryleneoxide, polycarbonate, polyester, can be imido alkylated with an imido alkylating agent of the formula.

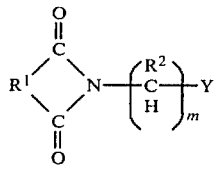

where $R^1$ is a divalent organic radical selected from the class consisting of divalent hydrocarbon radicals and halogenated divalent hydrocarbon radicals, $R^2$ is selected from hydrogen, monovalent hydrocarbon radicals, Y is a halogen or hydroxy radical, and m is an integer having a value of from 1 to 4 inclusive.

Radicals included by $R^1$, are for example, arylene radicals, such as phenylene, biphenylene, naphthylene, anthrylene, etc., alkylene radicals, such as ethylene, trimethylene, tetramethylene, etc., halogenated arylene and alkylene radicals such as chlorophenyl, chloronaphthylene, chloroethylene, chlorotrimethylene, etc.; aliphatically unsaturated radicals such as,

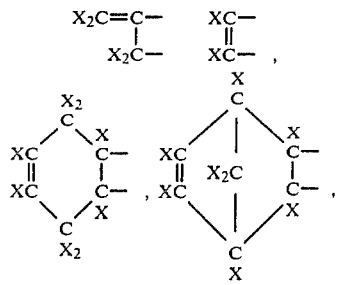

where X is the same or different radical selected from hydrogen, lower alkyl, halogen, such as chloro, methyl, ethyl, propyl, bromo, etc. Monovalent and hydrocarbon radicals included by $R^2$ are, for example, phenyl, chlorophenyl, methyl, ethyl, propyl, butyl, hexyl, heptyl, octyl, etc.

A preferred form of polyimides are the polyamideimides shown in Fessler U.S. Pat. No. 3,975,345, assigned to the same assignee as the present invention. The polyamideimides can be made by reacting two moles of trimellitic anhydride, per mole of organic diamine, such as methylene dianiline, followed by contactng the resulting bis(N-4-carboxyphthalimido) organo reaction product with an organic polyisocyanate, such as tolylene diisocyanate.

Included by the term organic solvent are polar organic solvents, such as dipolar aprotic solvents, chemically inert to the reactants during the practice of the invention. Some of the solvents which can be employed are for example, N,N-dimethylformamide, N,N-dimethylacetamide, N,N-diethylformamide, N,N-diethylacetamide, N,N-dimethylmethoxy acetamide, N-methyl caprolactam, dimethylsulfoxide, N-methyl-2-pyrrolidone, tetramethyl urea, pyridine, dimethylsulfone, tetramethyl sulfone, N-methylformamide, N-acetyl-2-pyrrolidone. In addition, other diluent solvents substantially inert during the practice of the method can also be utilized, such as aliphatic hydrocarbons, alcohols, ethers, etc.

In the practice of the invention, the aqueous dispersion of the polyimide is made by initially forming a mixture of the polyimide and an organic solvent which has a sprayable consistency. The polyimide organic solvent mixture is then introduced into water under conditions of high agitation, resulting in production of a dispersion of fine particles of the polyimide and organic solvent throughout the water.

The mixture of the polyimide and the organic solvent which is of sprayable consistency can be made by forming the polyimide directly in the organic solvent by well known chemical techniques. In one instance, for example, a polyamide acid can be formed by reacting an organic dianhydride and organic diamine which is completely imidized before it is introduced into water. A preferred procedure is to produce the polyimide in situ without going through a polyamide acid in stable form, such as where in organic diisocyanate is reacted with a bisimide having terminal isocyanate reactive groups, such as carboxy groups. Other procedures will be obvious to those skilled in the art, such as where a polyesterimide is formed by reacting a bisimide having terminal reactive groups with a poly-functional carboxylic acid. Of course, polyimides also can be used which are already preformed, which have to be mechanically dispersed into the organic solvent to produce a sprayable consistency. This can be achieved by mechanical attrition techniques, such as ball milling, etc.

The sprayable blend of the polyimide and organic solvent as described above is then introduced into water under conditions of high agitation to produce a finely divided aqueous dispersion of organic solvent-polyimide blend in finely divided form, such as a colloidal dispersion. The organic solvent-polyimide blend can be directly sprayed into water or it can be poured into water while the water is under a high degree of agitation, such as afforded by the use of a stirrer, etc. The water may contain additives aimed at stabilizing the final dispersion or such additives may be added at a later stage. The resulting aqueous dispersion is substantially stable at ambient conditions for extended periods of time. In the course of several months the dispersion tend to settle slowly, but the settled solids can be readily redispersed by agitation. It has been found expedient to employ a stirrer to stabilize the aqueous dispersion when it is employed as an electrocoating bath.

It has been found that a polyamide acid salt electrocoating bath can require voltages of from 150 to 200 V to effect electrodeposition, depending upon such factors as the solids concentration of the polyamide acid salt bath, the degree of neutralization of the polyamide acid salt radical, the distance between the electrodes, the speed at which the conductor is passing through the bath, etc. The aqueous dispersions of the present invention require significantly less voltage than the aqueous polyamide acid salt mixtures of the prior art. Depending upon the number of polyamide acid salt radicals on the polyimide backbone and the degree of neutralization, for purposes of achieving polyamide acid salt stability at ambient temperatures, the polyimide aqueous dispersion of the present invention free of polyamide acid salt radicals can require as little as one tenth of the power requirements for electrodeposition.

Metallic conductors, such as copper wire, aluminum strip, aluminum foil, etc., can be continuously electrocoated with the aqueous dispersions of the present invention at voltages as low as 10-20 V. The resulting polyimide coated conductors have substantially the same or superior insulating characteristics as the polyimide coated conductors derived from the use of polyamide acid salt.

In order that those skilled in the art will be better able to practice the invention, the following example is given by way of illustration and not by way of limitation. All parts are by weight.

EXAMPLE 1.

There was added 76.85 parts of trimellitic anhydride to a solution containing 39.65 parts of methylene dianiline dissolved in 255 parts of N-methylpyrrolidone to produce a solution having a mole ratio of trimellitic anhydride to methylene dianiline of 2 to 1. The mixture was cooled in an ice bath and the contents were stirred for 3 hours. The solution was then allowed to warm to room temperature and 50 parts of xylene and 0.1 parts of triphenylphosphite were added. This solution was then heated to reflux for 10 hours. Water was evolved and collected. A sample of the solution was removed and titrated with a standard base solution in accordance with known procedures and there was found 1.014 meq of carboxy per gram of solution. This indicated that there was produced 4,4'-bis(N-4-carboxyphthalimido)-diphenylmethane.

There was added to 128.32 parts of the above described bis(N-4-carboxyphthalimido)diphenylmethane, a solution of 11.33 parts in the form of an isomeric mixture of toluene diisocyanates in a N-methylpyrrolidone solution at 20% solids to produce a mixture having 130.12 meq of carboxy and 130.12 meq of isocyanate. The addition of the toluene diisocyanate was performed in a drop wise manner over a period of 1 hour starting at a temperature of 110° C. The temperature was then increased to 160° C. and maintained for 1 hour after the addition had been completed. The mixture was then allowed to cool to room temperature. There was obtained a viscous red-brown solution.

There was heated a mixture of 3452 parts of the above described polyamideimide in N-methylpyrrolidone at about 25% solids to 100° C. before being introduced into a Devilbiss spray gun. The gun had been preheated and the heated solution was discharged into a hot solution of 8 parts of Daxad-11 dispersing agent, which is a mixture of Na-salts of polymerized alkyl naphthalene sulfonic acids and a product of W.R. Grace Company, in 6920 parts of distilled water. During the discharge, the aqueous solution was agitated at 1800 RPM in a Henchel Mill. The resulting mixture was ball milled for 100 hours. Water was then added to replace evaporation losses to produce a final aqueous electrocoating dispersion having about 10.2% by weight of polyamideimide, 29.6 by weight of N-methylpyrrolidone and about 60.2% by weight of water. Based on method of preparation, the resulting mixture was a colloidal dispersion of a polyamideimide with a pH equal to 6.95, substantially free of amide acid salt radicals.

A piece of aluminum 1 inch by 3 inches by 0.016 inch was cleaned by dipping into a solution containing 40 parts of sodium hydroxide and 2 parts of sodium phosphate and 543 parts of water. The aluminum strip was then soaked after a tap water rinse into a solution of sulfuric acid for 30 seconds. The aluminum strip was then rinsed with distilled water and air dried at 125° C. About one half of the strip was immersed into the electrocoating mixture and electrocoated for 10 seconds at 15 volts. The electrocoated strip was then dried at 125° C. for from 2 to 3 minutes and then heated to 250° C. for 2 minutes. There was obtained an insulated aluminum conductor having a uniform coating of 0.5-0.75 mil of polyimide which adhered well to the aluminum substrate.

Although the above example is limited to only a few of the very many variables within the scope of the present invention, including aqueous dispersions of polyimide broadly defined in the description preceding this example, and to a variety of conditions which can be employed in the practice of the method of the present invention, those skilled in the art would know that the present invention is more fully described in the description preceding this example.

What we claim as new and desire to secure by Letters Patent of the United States is:

1. In an electrocoating process comprising electrophoretically coating a conductor with an organic resin by passing the electrical conductor into an electrocoating bath comprising an aqueous dispersion of the organic resin whereby the organic resin is electrophoretically deposited onto the electrical conductor resulting in an insulated conductor having an organic resin insulating coating with pin holes requiring a second application step to substantially reduce the pin holes in the electrophoretically deposited resin and a baking step, the improvement which comprises utilizing as the electrocoating bath, a colloidal dispersion of a polyimide in an aqueous organic solvent medium which is formed by (1) making a sprayable, substantially uniform mixture of a polyimide and an organic solvent, (2) introducing the sprayable mixture of (1) into water under conditions of high agitation to produce a colloidal dispersion where the electrocoating bath consists essentially of (A) 5 to 45% of organic solvent, (B) 40% to 94% of water and (C) 1% to 15% of a polyimide reaction product of trimellitic anhydride, methylenedianiline and toluene diisocyanate, where the sum of (A)+(B)+(C) is 100%, whereby a pinhole-free organic resin coating is formed which does not require a second application step.

2. A method in accordance with claim 1, where the electrical conductor is an aluminum strip.

* * * * *